(12) United States Patent
Chang et al.

(10) Patent No.: US 9,140,948 B2
(45) Date of Patent: *Sep. 22, 2015

(54) LIQUID CRYSTAL DISPLAY PANEL HAVING A LIGHT BLOCKING ELECTRODE

(71) Applicant: SAMSUNG DISPLAY CO., LTD., Gyeonggi-Do (KR)

(72) Inventors: Jong-Woon Chang, Chungcheongnam-Do (KR); Yeong-Keun Kwon, Gyeonggi-Do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 266 days.

This patent is subject to a terminal disclaimer.

(21) Appl. No.: 13/784,900

(22) Filed: Mar. 5, 2013

(65) Prior Publication Data

US 2013/0176515 A1 Jul. 11, 2013
US 2015/0227012 A9 Aug. 13, 2015

Related U.S. Application Data

(63) Continuation of application No. 11/773,585, filed on Jul. 5, 2007, now Pat. No. 8,400,599.

(30) Foreign Application Priority Data

Aug. 16, 2006 (KR) .......................... 10-2006-0077135
Oct. 26, 2006 (KR) .......................... 10-2006-0104553

(51) Int. Cl.
*G02F 1/1333* (2006.01)
*G02F 1/1343* (2006.01)
*G02F 1/1362* (2006.01)

(52) U.S. Cl.
CPC .... *G02F 1/136286* (2013.01); *G02F 1/136209* (2013.01); *G02F 2001/136218* (2013.01)

(58) Field of Classification Search
CPC .................... G02F 1/136286; G02F 1/136209; G02F 1/136213; G02F 1/136218
USPC ....................... 349/38–39, 139, 111
See application file for complete search history.

(56) References Cited

U.S. PATENT DOCUMENTS 5,696,566 A 12/1997 Kim et al.
6,525,788 B1 2/2003 Nakagawa et al.
(Continued)

FOREIGN PATENT DOCUMENTS

EP 1 037 094 A2 9/2000
JP 10-239699 9/1998
(Continued)

OTHER PUBLICATIONS

European Search Report in connection with EP 07015869 dated Dec. 28, 2007.
(Continued)

*Primary Examiner* — Dennis Y Kim
(74) *Attorney, Agent, or Firm* — F. Chau & Associates, LLC

(57) ABSTRACT

A liquid crystal display panel with enhanced image quality is disclosed. The liquid crystal display panel has a plurality of gate lines, a plurality of data lines, a plurality of thin film transistors connected to gate line and data line, a plurality of pixel electrodes, and floating electrode(s). The floating electrode extends along the data line to prevent light leakage and vertical crosstalk. Throughout the whole liquid crystal display panel, the floating electrode is electrically interconnected to lessen vertical crosstalk.

11 Claims, 20 Drawing Sheets

(56) References Cited

U.S. PATENT DOCUMENTS

| | | | |
|---|---|---|---|
| 6,531,993 | B1 | 3/2003 | Yamazaki et al. |
| 8,400,599 | B2 * | 3/2013 | Chang et al. .................. 349/138 |
| 2004/0246409 | A1 | 12/2004 | Jeon et al. |
| 2004/0263710 | A1 | 12/2004 | Song et al. |
| 2007/0182875 | A1 * | 8/2007 | Kim et al. ........................ 349/44 |
| 2008/0068550 | A1 * | 3/2008 | Chang et al. .................. 349/143 |

FOREIGN PATENT DOCUMENTS

| | | |
|---|---|---|
| JP | 2000-122097 | 4/2000 |
| JP | 2000-321603 | 11/2000 |
| JP | 2001-332742 | 11/2001 |
| JP | 2003-043948 | 2/2003 |
| JP | 2005-004207 | 1/2005 |
| KR | 1020040049569 | 6/2004 |

OTHER PUBLICATIONS

Korean Office Action dated Jul. 30, 2014 issued in corresponding Korean Patent Appln No. 10-2014-0039393.
Korean Office Action dated Jun. 3, 2013 issued in corresponding Korean Appln No. 10-2013-0018812.

* cited by examiner

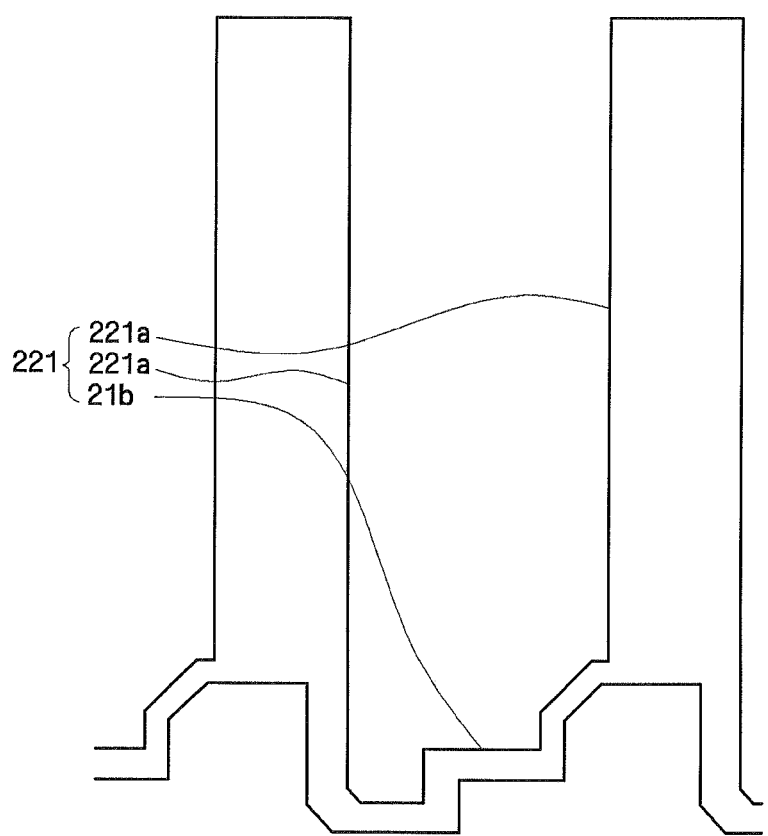

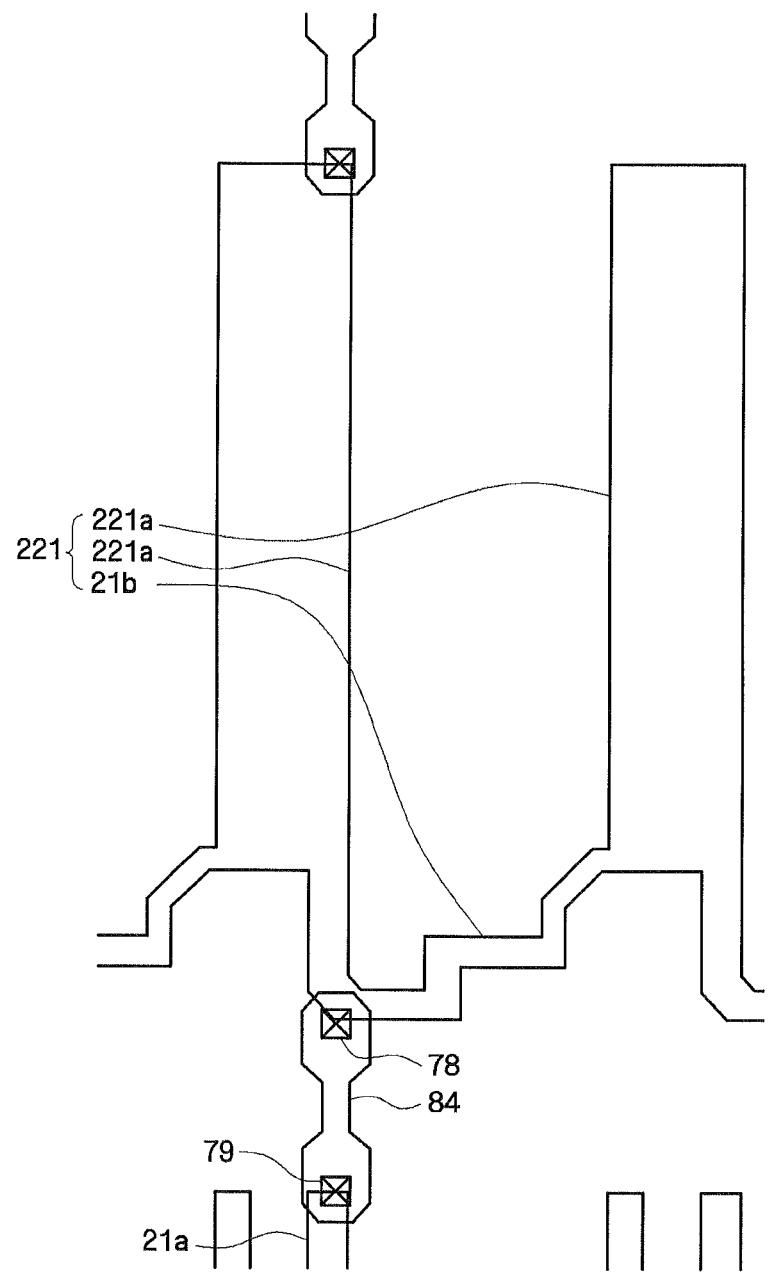

LIQUID CRYSTAL DISPLAY PANEL HAVING A LIGHT BLOCKING ELECTRODE

CROSS-REFERENCE TO RELATED PATENT APPLICATIONS

This application is a Continuation of U.S. application Ser. No. 11/773,585 filed on Jul. 5, 2007, which claims priority to Korean Patent Application Nos. 10-2006-0077135, and 10-2006-0104553, filed on Aug. 16, 2006, and Oct. 26, 2006, respectively, the disclosures of which are incorporated by reference herein in their entireties.

BACKGROUND OF THE INVENTION

1. Field of the Invention

The present invention relates to a liquid crystal display (LCD) panel, and more particularly, the present invention relates to a LCD panel having improved image quality.

2. Description of the Related Art

A liquid crystal display (LCD) panel comprises a pair of opposing substrates with a liquid crystal layer therebetween. One of the substrate is a common electrode substrate having a common electrode while the other substrate is a thin film transistor (TFT) substrate having a plurality of TFTs. The common electrode substrate and the TFT substrate are assembled by a seal line disposed at the edge of both the common electrode substrate and the TFT substrate. The liquid crystal layer is disposed between the common electrode substrate and the TFT substrate.

Liquid crystal molecules of the liquid crystal layer are arranged in accordance with the electricity given to the common electrode substrate and TFT substrate respectively.

The TFT substrate has a plurality of gate lines, a plurality of data lines and a plurality of pixels. Each of the gate lines extends horizontally and transmits gate signals. On the other hand, each of the data lines extends vertically and transmits data signals. Each of the pixels may be defined by one gate line and one data line and has a switching element and a storage capacitor.

A switching element may be formed near the cross point of one gate line and one data line. The switching element is a thin film transistor (TFT) with a gate electrode connected to the gate line, source electrode connected to the data line and drain electrode connected to a pixel electrode. The drain electrode may be electrically connected to a liquid crystal capacitor and to a storage capacitor.

Not being a self-emitting display device, an LCD module has a backlight unit behind the LCD panel that provides light to the LCD panel. With light provided from the backlight unit, transmittance of the LCD panel is controlled by arrangement of the liquid crystal molecules of each pixel by selectively passing light to a display image.

With the conventional LCD module of the above structure, light is apt to leak in the gap between the data line and pixel electrode to make poor image quality. Thus, to lessen the light leakage, a black matrix is generally adapted on the common electrode substrate. Specifically, the black matrix is located where the leaked light passes. However, the black matrix may result in a smaller aperture ratio of the overall LCD module to decrease the luminance of the display resulting in poor image quality.

Also, with the conventional LCD module, data signals and pixel electrodes may influence each other. Namely, charge coupling between the data line and pixel electrode can occur causing irregular vertical crosstalk along the data line.

BRIEF SUMMARY OF THE INVENTION

Accordingly, it is an aspect of the present invention to provide a LCD module with less light leakage and charge coupling between the data line and pixel electrode to enhance image quality of LCD module.

The foregoing and/or other aspects of the present invention are achieved by providing an LCD panel including a plurality of gate lines, a plurality of data lines, a plurality of pixels and floating electrode(s).

According to one embodiment of the present invention, the floating electrode includes a light blocking pattern extending along the data line, an inter-pixel connection pattern connecting the light blocking patterns of different pixels and intra-pixel connection pattern connecting the light blocking patterns within one pixel.

According to another embodiment of the present invention, the floating electrode includes a light blocking pattern extending along the data line and a plurality of inter-pixel connection patterns each connecting the light blocking patterns of different pixels.

According to an alternate embodiment of the present invention, the floating electrode includes a light blocking pattern wider than and overlapping the data line.

According to another alternate embodiment of the present invention, the floating electrode includes a light blocking pattern and inter-pixel connection pattern connecting the light blocking patterns of horizontally neighboring pixels. Further, a bridge electrode connects the light blocking pattern of one pixel and inter-pixel connection pattern in the vertically neighboring pixel.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which:

FIG. 6C is a layout of a floating pattern formed on the TFT substrate of the exemplary embodiment of FIG. 6A according to the present invention;

FIG. 9B is a layout of a floating pattern and a bridge electrode formed on the TFT substrate of the exemplary embodiment of FIG. 9A according to the present invention.

DETAILED DESCRIPTION OF THE INVENTION

Figure 1A:
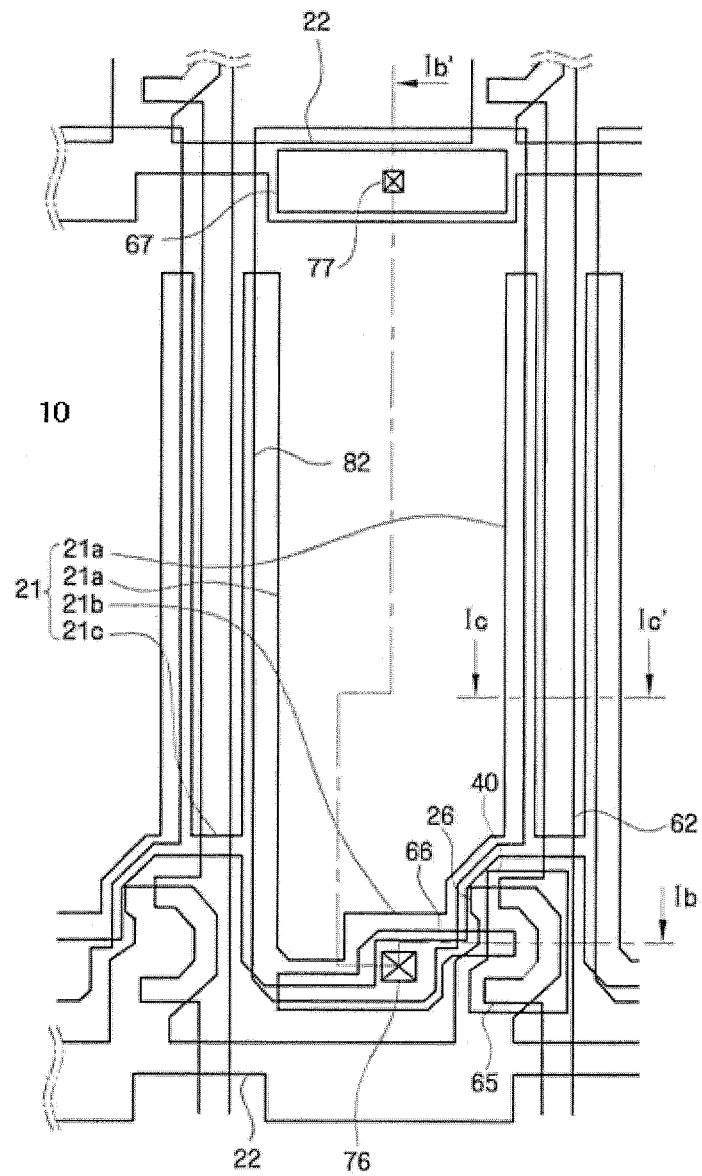
FIG. 1A is a layout of a pixel of a thin film transistor (TFT) substrate of an exemplary embodiment according to the present invention.

Reference will now be made in detail to exemplary embodiments of the present invention, examples of which are illustrated in the accompanying drawings, wherein like reference numerals refer to like elements throughout. The embodiments are described below in order to explain the present invention by referring to the figures.

The LCD panel shown in FIGS. 1A through 4 is explained according to one embodiment of the invention. The LCD panel includes a TFT substrate, a common electrode substrate and a liquid crystal layer disposed inbetween the TFT substrate and the common electrode substrate. The TFT substrate includes a plurality of gate lines, a plurality of data lines, and a plurality of TFTs electrically connected to the gate line and the data line to transmit voltage to a pixel electrode. The common electrode substrate faces the TFT substrate and includes a common electrode to control the liquid crystal layer.

Figure 1B:
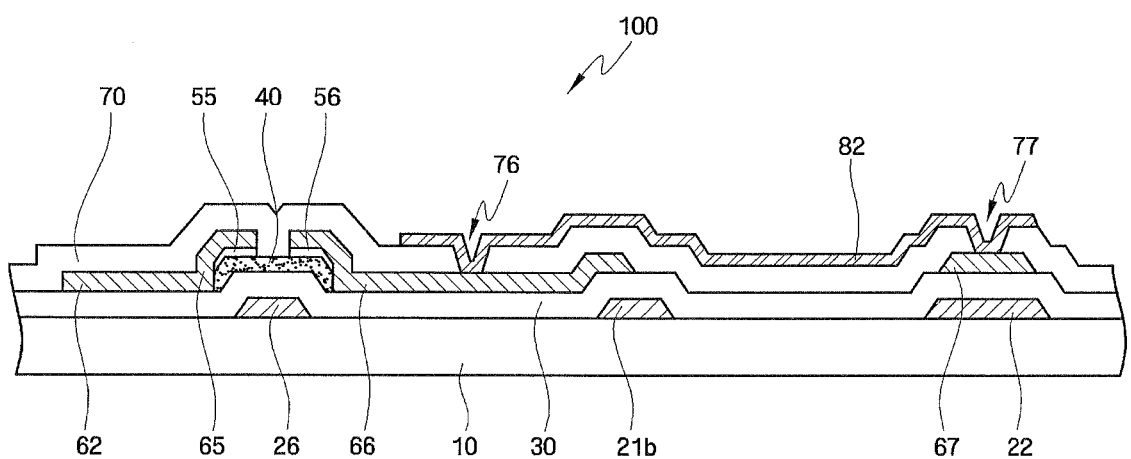
FIG. 1B is a cross-sectional view of a pixel taken along a line Ib-Ib' of the exemplary embodiment of FIG. 1A according to the present invention.
Figure 1C:
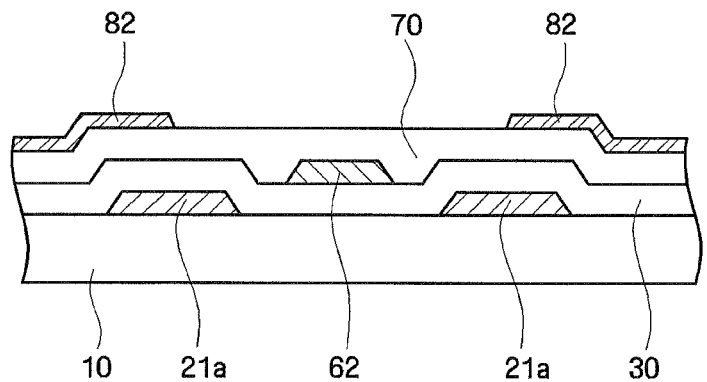
FIG. 1C is a cross-sectional view of a pixel taken along a line Ic-Ic' of the exemplary embodiment of FIG. 1A according to the present invention.
Figure 1D:
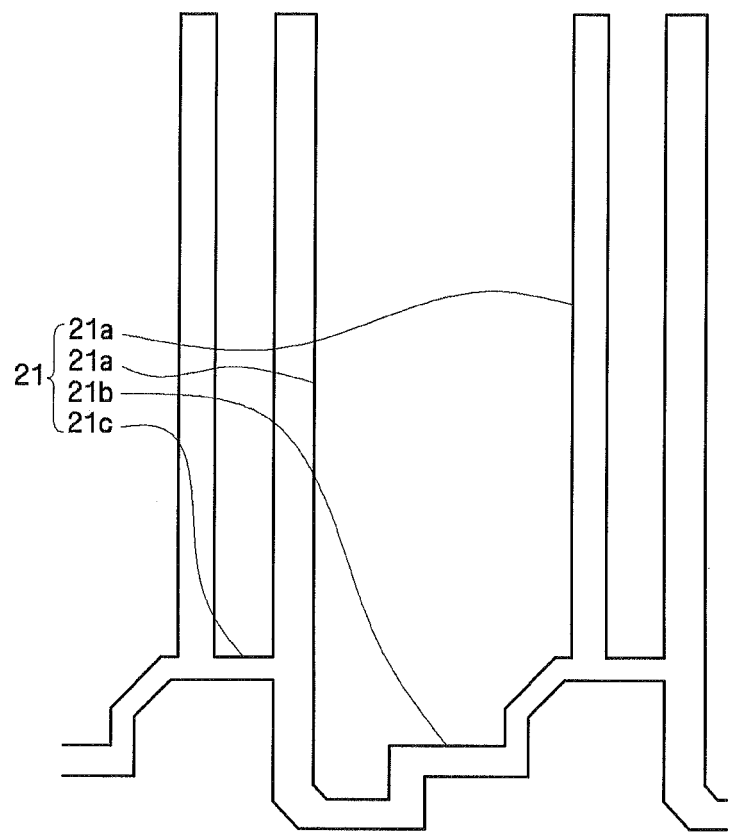
FIG. 1D is a layout of a floating electrode formed on the TFT substrate of the exemplary embodiment of FIG. 1A according to the present invention.

FIG. 1A is a layout of a pixel of the TFT substrate. FIG. 1B is a cross-sectional view of a pixel taken along a line Ib-Ib' of FIG. 1A. FIG. 1C is a cross-sectional view of a pixel taken along a line Ic-Ic' of FIG. 1A. At last, FIG. 1D is a layout of a floating electrode formed on the TFT substrate of FIG. 1A.

On insulating substrate 10, a gate wiring which comprises a gate line 22 and gate electrode 26 projected from gate line 22 is formed. The floating electrode 21 is formed on the insulation substrate 10 and arranged in horizontal direction with vertically extending light blocking pattern 21a near the data line 62. The floating electrode 21 of each pixel is, throughout the TFT substrate, interconnected to each other and electrically isolated from external voltage source of the TFT substrate. Alternatively, the interconnected floating electrode 21 throughout the TFT substrate is give a predetermined voltage as long as the floating electrode is effective for vertical crosstalk.

Specifically, floating electrode 21 comprises a light blocking pattern 21a, intra-pixel connection pattern 21b, and inter-pixel connection pattern 21c. The light blocking pattern 21a is located along the data line 62 to prevent light leakage between the data line 62 and a pixel electrode 82. The light blocking pattern 21a may or may not overlap with data line 62. Also, light blocking pattern 21a may or may not overlap with pixel electrode 82.

A plurality of light blocking patterns 21a may be formed within one pixel. Thus, because every pixel may have the same or similar structure within one horizontal line of the TFT substrate, every pixel may have a plurality of light blocking patterns 21a. Here, a plurality of light blocking patterns 21a is connected by an intra-pixel connection pattern 21b of floating electrode 21. Similarly, different pixel's light blocking patterns 21a are connected by an inter-pixel connection pattern 21c of floating electrode 21.

Thus, every light blocking pattern 21a is electrically connected by inter-pixel connection patterns 21c and intra-pixel connection patterns 21b within one horizontal line along gate line 22. On the other hand, the whole floating electrode 21 is not electrically connected to external voltage source.

For designing of storage capacitance of the LCD module, previous capacitance type and independent capacitance line type has been introduced. Previous capacitance type uses storage capacitance by overlapping pixel electrode 82 and previous gate's extended width, whereas independent capacitance line type uses storage capacitance by overlapping pixel electrode 82 and specially added common voltage (Vcom) line of the same gate metal. Even though the present invention is shown with previous capacitance type, the independent capacitance line type may also be used within the scope of the present invention.

On the TFT substrate, gate wiring 22, 26 and floating electrode 21 may include at least one of Al, Al alloy, Ag, Ag alloy, Cu, Cu alloy, Mo, Mo alloy, Cr, Ti and Ta. Gate wiring 22, 26 and floating electrode 21 may have a multi-layered structure with conductive layers of different physical characteristics. At least one of the multi-layered structures may be a low resistivity conductive metal of Al, Al alloy, Ag, Al alloy, Cu, or Cu alloy to reduce signal delay or voltage drop of the gate wiring 22, 26 and floating electrode 21. On the contrary, at least one layer of the multi-layered structure may be Indium Tin Oxide (ITO) or Indium Zinc Oxide (IZO) friendly material such as Mo, Mo alloy, Cr, Ti, or Ta. Exemplary combinations of low resistivity and good contact characteristics are either lower layer of Cr and upper layer of Al or lower layer of Al and upper layer of Mo. However, the gate wiring and floating electrode material is not limited to the already introduced examples and may be any combination of various conductive materials.

On the gate wiring and floating electrode 21, a gate insulating layer 30 is formed with insulating material such as SiNx. On the gate insulating layer 30, semiconductor layer 40 is formed with material such as hydrogenated amorphous silicon or poly-silicon. The semiconductor layer 40 may be either line pattern or isolated pattern. The isolated pattern semiconductor layer is formed on the gate line 22 as shown in the present invention while the line pattern semiconductor layer may be formed under the data line 62 and extends to the gate line 22 with data line's 62 shape.

On the semiconductor layer 40, resistive contact layer 55, 56 is formed with highly doped hydrogenated amorphous silicon or silicide. The resistive contact layer 55, 56 may be either line pattern or isolated pattern. For example, isolated pattern resistive contact layer can be located under the source and drain electrode as in the present invention, whereas the line pattern resistive contact layer may extend under the data line 62.

On the resistive contact layer 55, 56 and gate insulation layer 30, data line 62, source electrode 65 and drain electrode 66 are formed. Data line 62 extends vertically to cross the gate line 22. Source electrode 65 is projected from the data line 62 and extends to the semiconductor layer 40 while drain electrode 66 on the semiconductor layer is separated from and facing the source electrode 65 with gate electrode 26 in the middle. The TFT consists of the gate electrode 22, source electrode 65 and drain electrode 66 and transmits electricity from source electrode 65 to drain electrode 66 when gate electrode 26 receives gate voltage.

Drain electrode 66 includes a bar type pattern on the semiconductor layer 40 and an extensive area that is elongated from the bar type pattern with contact hole 76. The data line 62, source electrode 65 and drain electrode 66 are collectively called data wiring.

Further, a capacitance electrode 67 of the same material and layer with data line 62 may be formed to overlap the previous gate line 22 by being electrically connected with the pixel electrode 82 via contact hole 77. The combination of capacitance electrode 67, previous gate line 22 and intervening gate insulation layer 30 can store capacitance of the liquid crystal layer.

Data wiring and the capacitance electrode 67 may be either a single layer or multi-layer including at least one of Al, Cr, Mo, Ta and Ti. For example, data wiring and capacitance electrodes may be a multi layer of Cr, Mo based material, Ta or Ti in one layer with a lower layer of Cr, Mo based material, Ta or Ti and an upper layer of low resistivity. More specifically, a lower layer of Cr and upper layer of Al, a lower layer of Al and upper layer of Mo, or a lower layer of Mo, middle layer of Al and upper layer of Mo may be used as the multi layered data wiring and capacitance electrode.

In the TFT, the confronting source electrode 65 and drain electrode 66 at least partially overlap with both gate electrode 26 and semiconductor layer 40 to transmit pixel driving voltage. Additionally, resistive contact layer 55, 56 is sandwiched between a semiconductor layer and either the source electrode 65 or the drain electrode 66 to reduce contact resistance.

On the data wiring 62, 65, 66, storage capacitance conductor 67 and exposed semiconductor layer 40, a passivation layer 70 are disposed. The passivation layer may be made of various materials such as inorganic material, organic material, or insulating material with a low dielectric constant. Here, inorganic material can be either SiNx or SiOx while organic material may be photosensitive and used for making a flat surface. Insulating material with a low dielectric constant is disposed by plasma enhanced chemical vapor deposition (PECVD) and can be either a-Si:C:O or a-Si:O:F. More than two different materials can be used for passivation layer 70. For example, when organic material is applied, an additional bottom layer of inorganic material can be used to prevent the organic material's direct contact with exposed semiconductor layer of TFT.

Contact holes 76, 77 are formed to partially uncover either a drain electrode 66 or storage capacitance electrode 67. On the passivation layer, pixel electrode 82 is formed along the inner line of each pixel. The pixel electrode 82 is electrically connected to the drain electrode 66 via drain electrode contact hole 76. Further, pixel electrode 82 is electrically connected to the storage capacitance electrode 67 via storage capacitance electrode contact hole 77.

Thus, pixel electrode 82 with a pixel driving voltage can control the arrangement of liquid crystal molecules by causing electric field in cooperation with the common electrode 90 of the common electrode substrate. Here, pixel electrode 82 is made of either transparent conductive material such as Indium Tin Oxide (ITO) and Indium Zinc Oxide (IZO) or reflective conductive material such as Al. On the pixel electrode 82 or passivation layer 70, an orientation layer (not shown) may be disposed to setup a basic orientation of the liquid crystal molecules.

Now, referring to FIGS. 1A, 1C, and 1D, floating electrode 21 is explained in detail. In FIG. 1A, floating electrode 21 extends along data line 62 with at least a partially overlapping relationship. In addition, a part of pixel electrode closest to the data line overlaps with the floating line, too. More specifically, light blocking pattern 21a of floating electrode 21 is disposed along the data line 62 and partially overlaps with a portion of pixel electrode 82. Further, inter-pixel connection electrode 21c partially overlaps with data line 62. From here, the light blocking electrode's function is explained. Liquid crystal molecules around the data line may be undesirably arranged because the electric field from data line 62 is more dominant than the electric field from the pixel electrode. Therefore, light around the data line passes in a wrong direction and light leakage can be seen outside of the LCD panel. However, wrongly directed light can be screened by a pattern around the data line. In FIG. 1A, light blocking pattern 21a screens the wrongly directed light and prevents light leakage.

However, the floated light blocking electrode 21a may be electrically coupled to data line 62 and may cause irregular vertical crosstalk of LCD panel. To solve this potential problem, in the current embodiment, each of the light blocking patterns 21a is electrically interconnected to a neighboring light blocking electrode 21a by inter-pixel connection pattern 21c and intra-pixel connection pattern 21b. Now, because the unified floating electrode is not influenced or coupled by or to a specific data line, irregular vertical crosstalk may not be seen.

If the unified floating electrode 21 passes a common voltage, liquid crystal molecules around the data line may experience an undesired electric field and be arranged incorrectly because it is being influenced by a common voltage rather than pixel electrode's voltage. Thus, floating electrode 21 is electrically independent from any other voltage to prevent light leakage.

Figure 2:
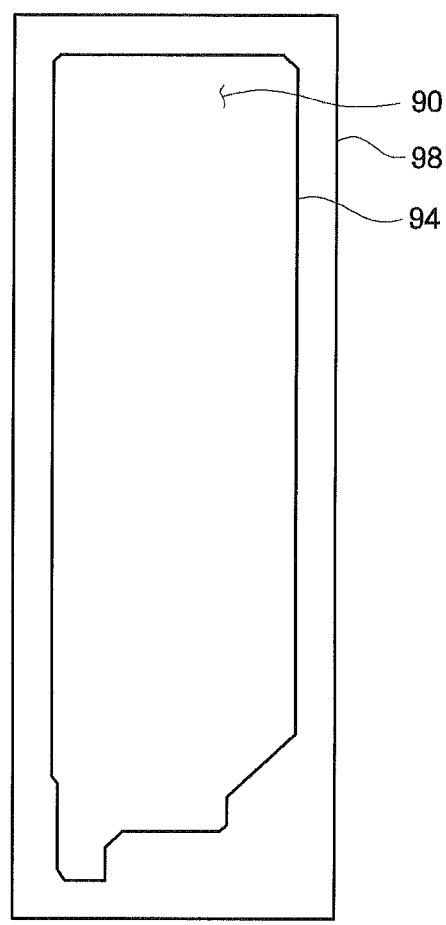
FIG. 2 is a layout of a pixel of a common electrode substrate of an exemplary embodiment according to the present invention.

In FIG. 2, a layout of a pixel of a common electrode substrate is introduced according to one embodiment of the present invention. Additionally, in FIG. 3A, a layout of a pixel of an assembled LCD panel with a TFT substrate, common electrode substrate and liquid crystal layer is introduced. Further, FIG. 3B shows a cross-sectional view of the LCD panel taken along a line IIIb-IIIb' of FIG. 3A.

Figure 3A:
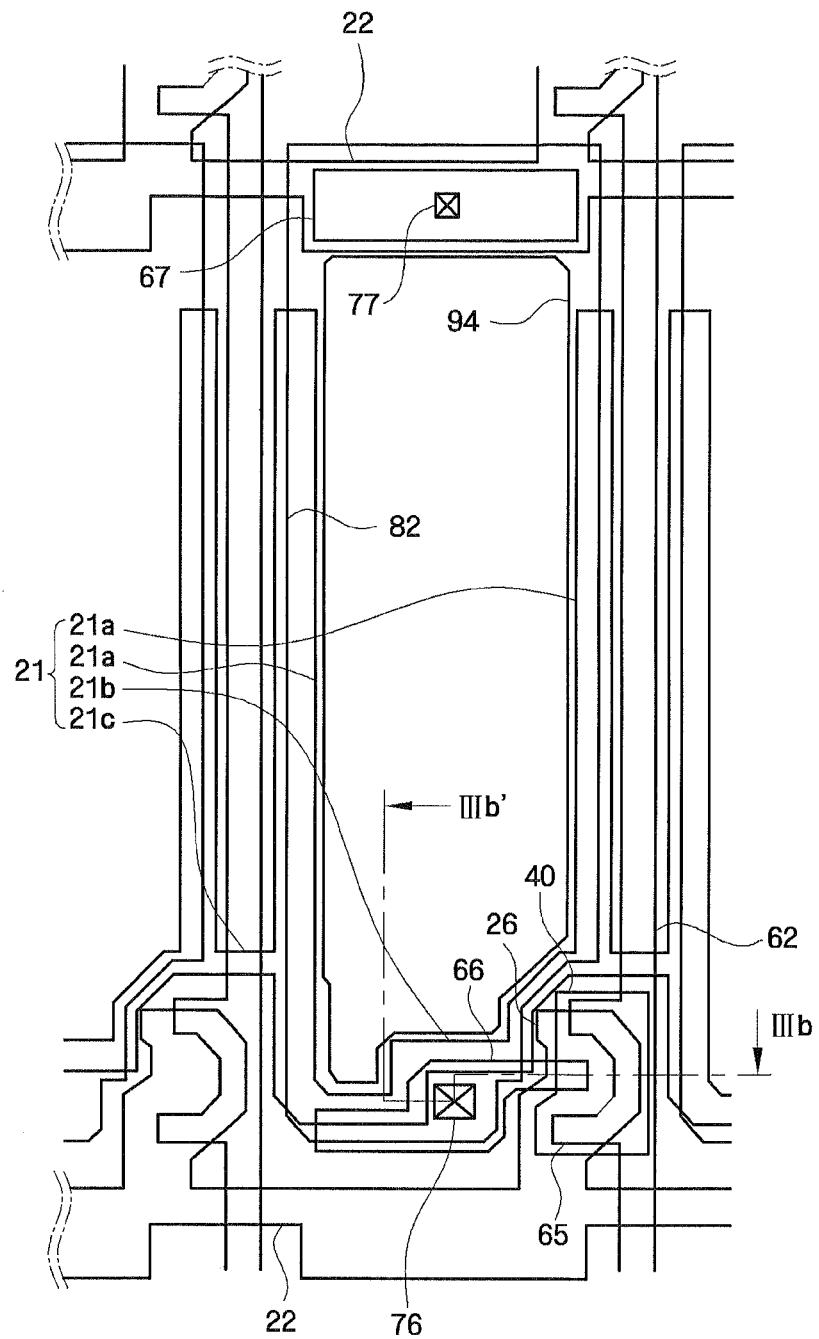
FIG. 3A is a combined layout of a pixel of a liquid crystal display (LCD) panel which is an assembly of the TFT substrate of FIG. 1A and common electrode substrate of FIG. 2 of an exemplary embodiment according to the present invention.
Figure 3B:
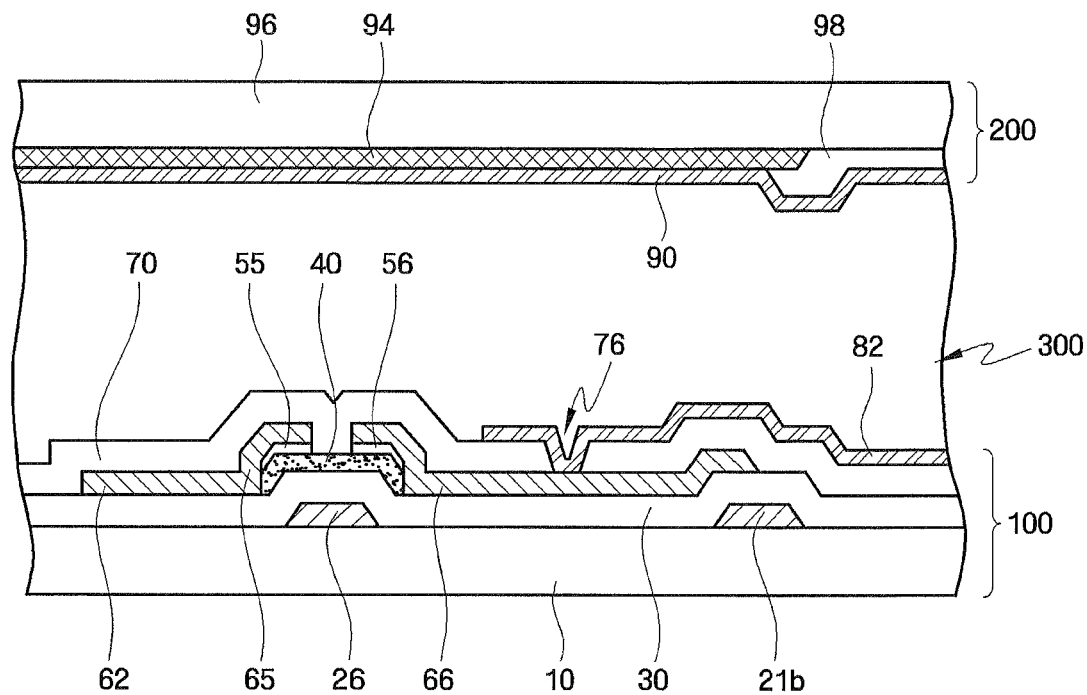
FIG. 3B is a cross-sectional view of the pixel taken along a line IIIb-IIIb' of the exemplary embodiment of FIG. 3A according to the present invention.

Throughout FIGS. 2, 3A and 3B, a black matrix 94 is formed on a transparent glass substrate 96. Black matrix 94 is also disposed around each of the pixels to prevent undesired light's transmitting. Black matrix 94 may be made of at least one such as Cr, metal oxide such as CrOx and organic material. In the light passing area between neighboring black matrix 94, color filter 98 is disposed to transmit red, green or blue light. An additional overcoat layer (not shown) may be formed on the color filter layer 98 and black matrix 94 to cover an uneven color filter layer and make one flat surface. Finally, on either color filter layer 98 or overcoat layer, transparent common electrode layer 90 of ITO or IZO is formed. A supplemental orientation layer (not shown) may be coated on the common electrode layer 90 to align liquid crystal molecules around the common electrode 90.

As shown in FIG. 3B, the LCD panel has a liquid crystal layer 300 and combined TFT substrate 100 and common electrode substrate 200. In assembling, color filter 98 of common electrode substrate 200 is aligned to overlap almost exactly with pixel electrode 82 of TFT substrate 100. Then the LCD panel is completed by perpendicularly attaching a pair of polarizers on the outer surface of TFT substrate 100 and common electrode substrate 200. Finally, the LCD module is completed by assembling the LCD panel, a backlight unit behind the LCD panel and frames encompassing the LCD panel and backlight unit.

Figure 4:
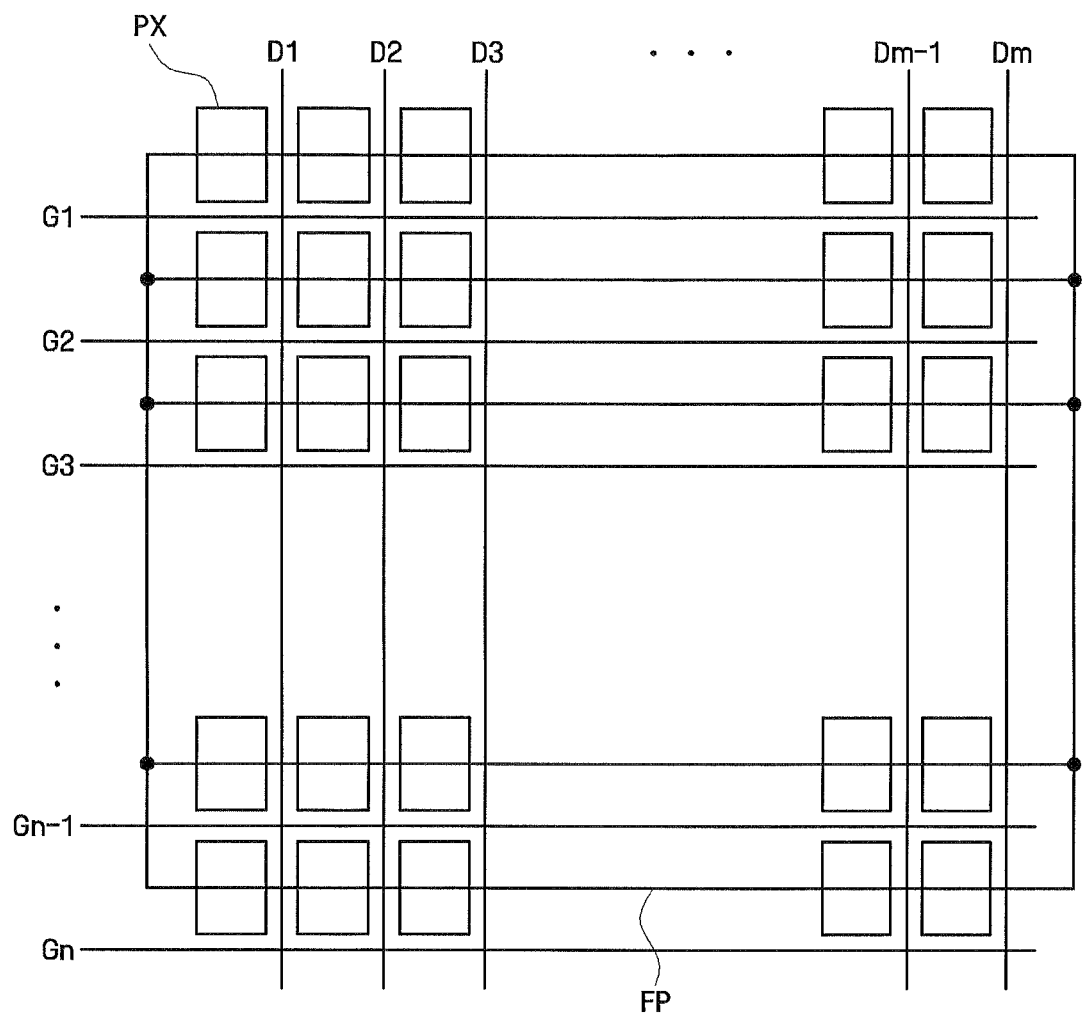
FIG. 4 is a simplified overall layout of the TFT substrate of the exemplary embodiment according to the present invention.

Referring to FIG. 4, floating electrode FP is explained in detail. In FIG. 4, the TFT substrate has a plurality of horizontally extending gate lines (G1, G2 . . . Gn), a plurality of vertically extending data lines (D1, D2 . . . Dm) and a plurality of pixels PX defined by each of gate lines and data lines. Throughout the whole LCD panel, each and every of the floating electrodes (FP) is interconnected between pixels in one horizontal line along each gate line and each of the horizontal lines' end points are interconnected to each other. Further, a whole floating electrode is isolated from external voltage source.

Figure 5A:
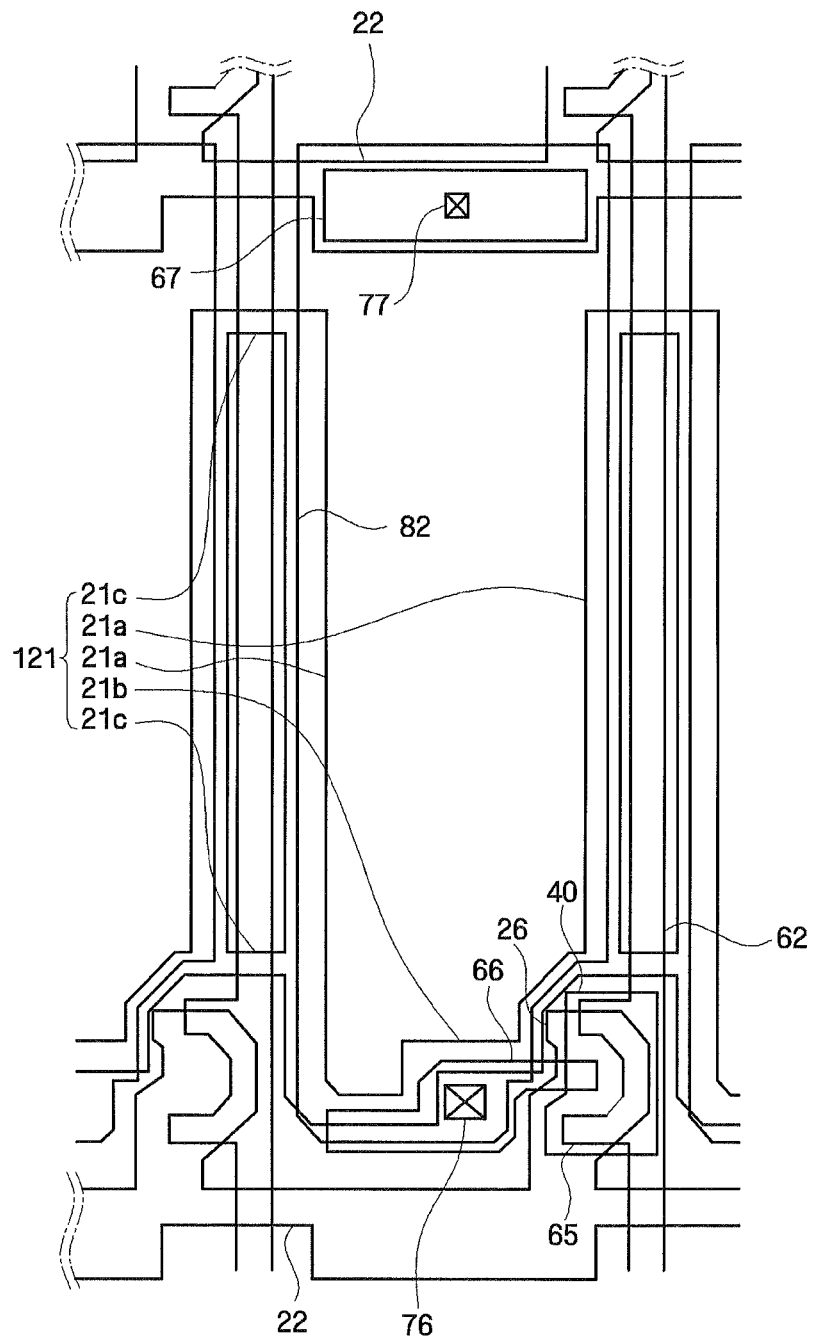
FIG. 5A is a layout of a pixel of a TFT substrate of an exemplary embodiment according to the present invention.
Figure 5B:
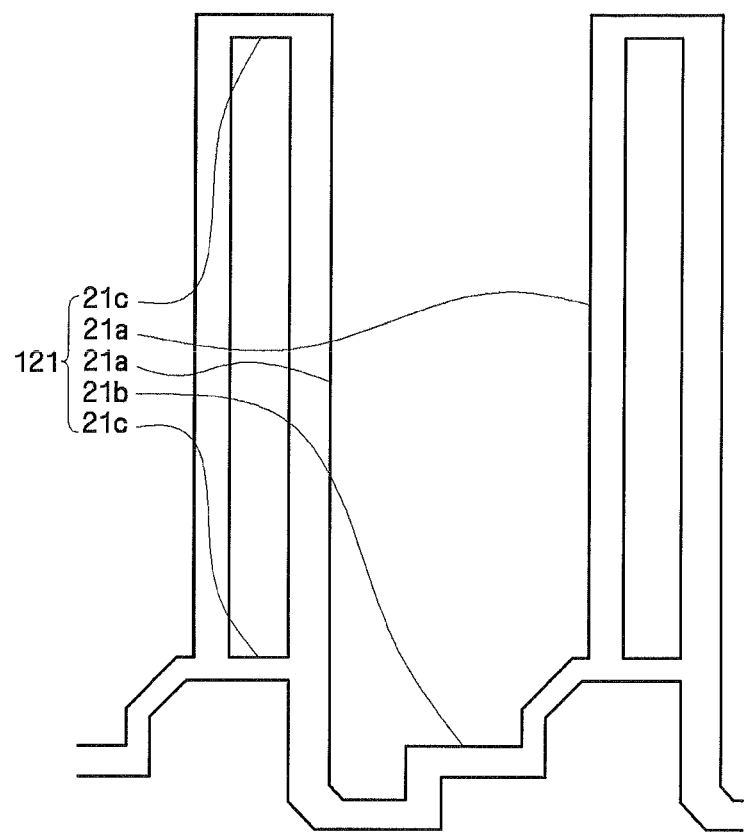
FIG. 5B is a layout of a floating pattern formed on the TFT substrate of the exemplary embodiment of FIG. 5A according to the present invention.

Referring to FIGS. 5A and 5B, another embodiment of present invention is explained. FIG. 5A is a layout of one pixel of the TFT substrate of the present embodiment, while FIG. 5B is a layout of a floating electrode of FIG. 5A. For a brief explanation, the same elements shown in FIGS. 1 through 4 are expressed with the same reference numeral and corresponding explanations will be omitted. Basically, every element other than the floating electrode in FIGS.

5A and 5B is the same with the corresponding element in FIGS. 1 through 4.

In FIGS. 5A and 5B, a pair of floating electrode's light blocking pattern 21a is interconnected by a plurality of inter-pixel connection patterns 21 c. At this point, even though FIGS. 5A and 5B show two inter-pixel connection patterns, the number of inter-pixel connection patterns may be more than two.

With more than two inter-pixel connection patterns 21c, more overlap area between data line 62 and floating electrode 21 can be obtained.

The enlarged overlap area can contribute in reducing the possible overlay difference between neighboring light blocking patterns 21a of floating electrodes 21 of different pixels. Then, the reduced overlay difference may contribute in overcoming the coupling capacitance difference of each data line and each of the light blocking patterns 21a. Thus, irregular vertical crosstalk can be less recognized by a viewer.

When a semiconductor layer is extended beneath data line 62, the enlarged overlap area between data line 62 and light blocking pattern 21a can be even more efficient for image quality. In detail, light entering the data line 62 area can induce unwanted photo current to damage image quality because a photo sensitive semiconductor layer is beneath data line 62. However, with enlarged inter-pixel connection pattern 21c, the photo current can be suppressed as floating electrode 21 is formed with gate wirings to block light from entering data line 62. Accordingly, image quality can be enhanced.

Figure 6A:
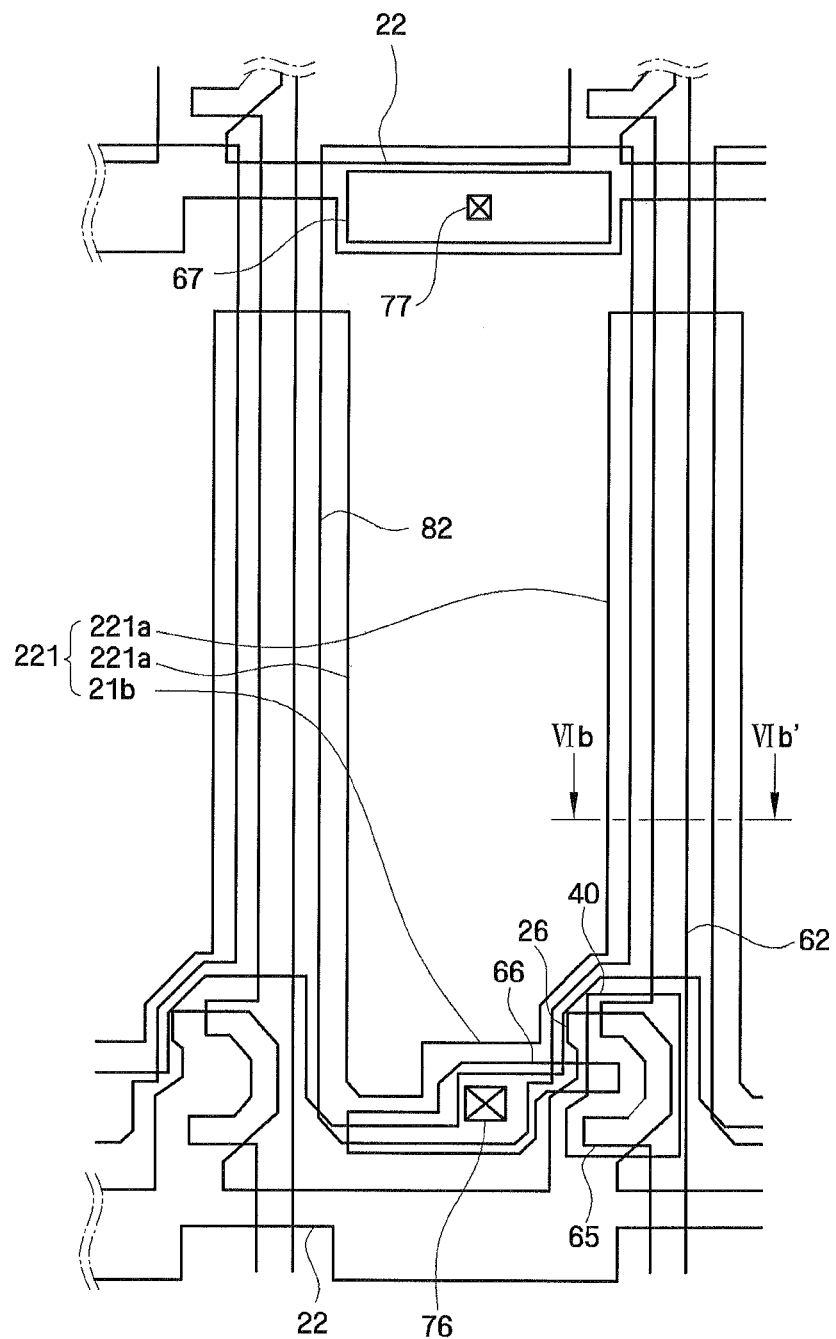
FIG. 6A is a layout of a pixel of a TFT substrate of an exemplary embodiment according to the present invention.
Figure 6B:
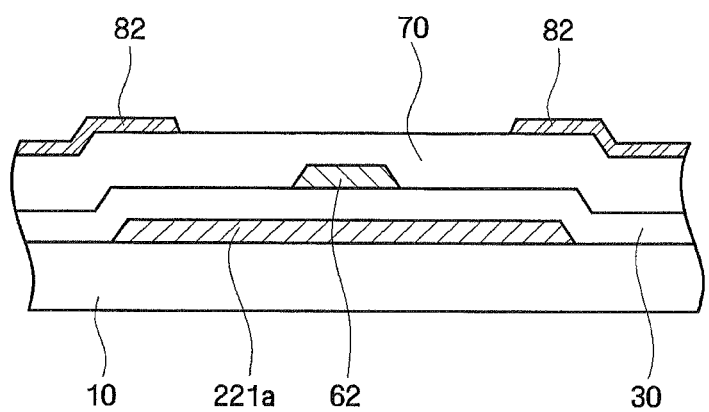
FIG. 6B is a cross-sectional view of a pixel taken along a line VIb-VIb' of the exemplary embodiment of FIG. 6A according to the present invention.

Referring to FIGS. 6A through 6C, another embodiment of this invention is explained. FIG. 6A is a layout of one pixel of the TFT substrate of the present embodiment while FIGS. 6B and 6C are cross-sectional views of a pixel taken along a line VIb-VIb' of FIG. 6A and layout of floating electrode of FIG. 6A respectively. For a brief explanation, the same elements shown in FIGS. 5A and 5B are expressed with the same reference numerals and corresponding explanations will be omitted. Basically, every element other than the floating electrode in FIGS. 6A through 6C is the same as the corresponding element in FIGS. 5A and 5B.

Specifically, floating electrode 221 of FIGS. 6A through 6C consists of a light blocking pattern 221a overlapping data line 62 and inter-pixel connection pattern 21b connecting a pair of light blocking patterns 221a within one pixel. More specifically, light blocking pattern 221a may be wide enough to fully overlap in at least one horizontal direction with data line 62. Further, light blocking pattern 221a may be widened to partially overlap with a pair of pixel electrodes 82 next to one data line 62. Similar to the embodiment of FIGS. 5A and 5B, the semiconductor layer may be under the data line 62. Consequently, the widened light blocking pattern 221a may lessen the recognition of vertical crosstalk and photo leakage occurring on the semiconductor layer beneath the data line 62.

Figure 7A:
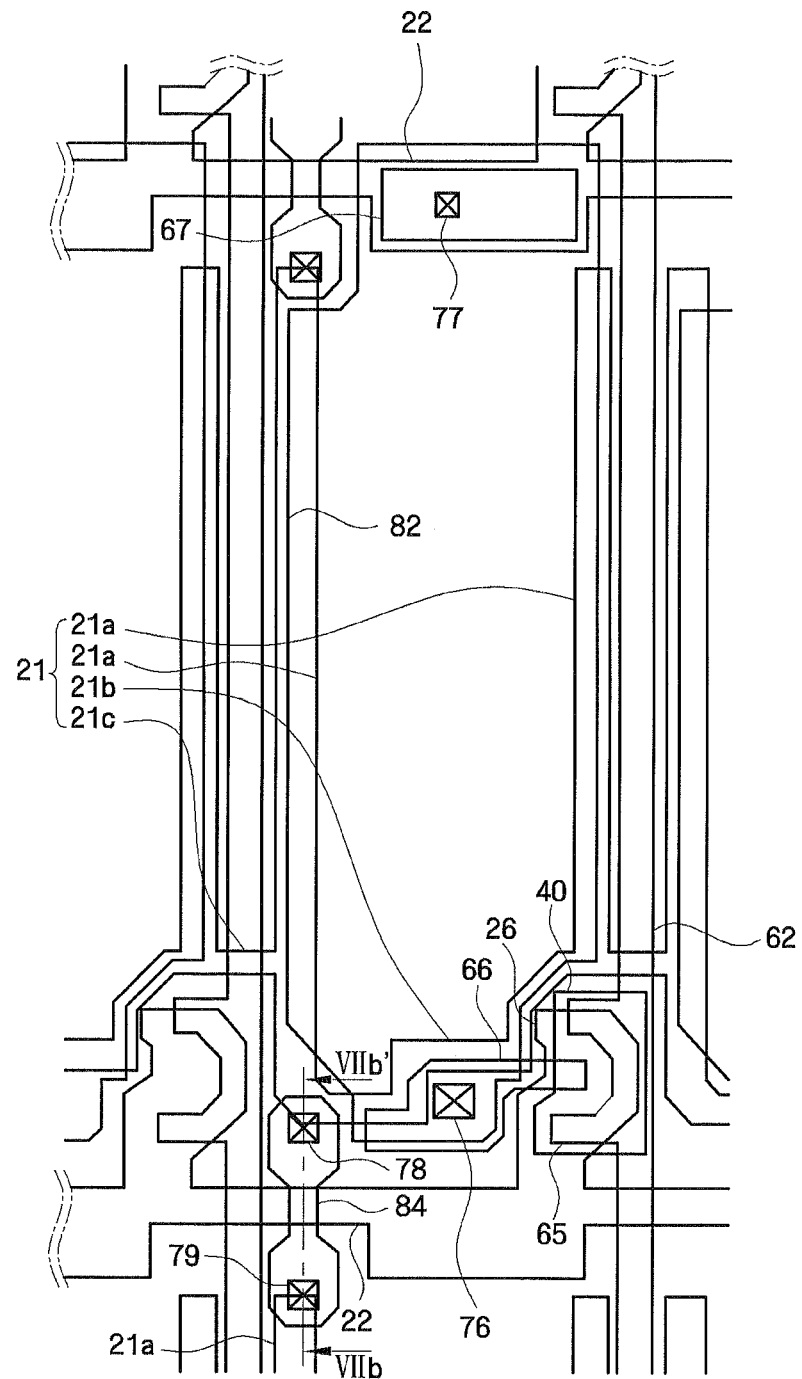
FIG. 7A is a layout of a pixel of a TFT substrate of an exemplary embodiment according to the present invention.
Figure 7B:
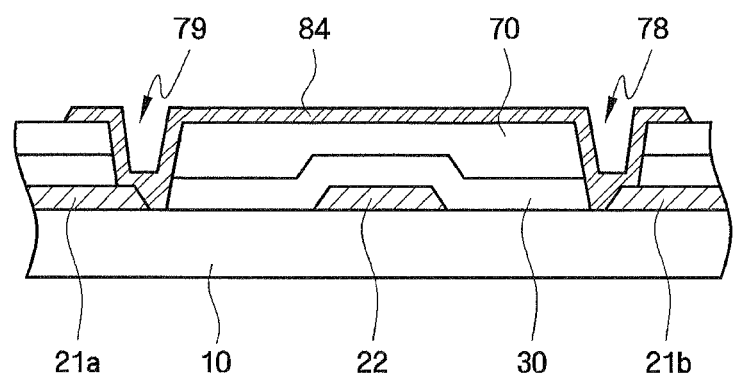
FIG. 7B is a cross-sectional view of a pixel taken along a line VIIb-VIIb' of the exemplary embodiment of FIG. 7A according to the present invention.
Figure 7C:
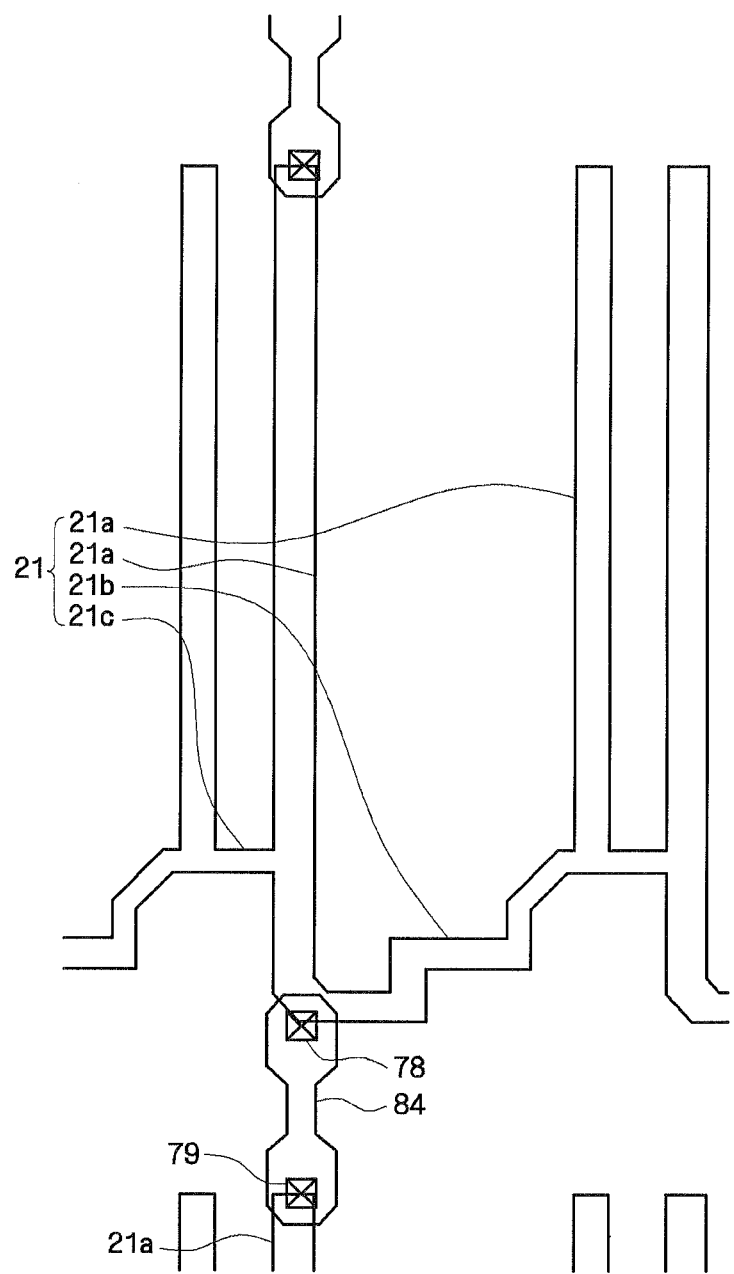
FIG. 7C is a layout of a floating pattern and a bridge electrode formed on the TFT substrate of the exemplary embodiment of FIG. 7A according to the present invention.
Figure 7D:
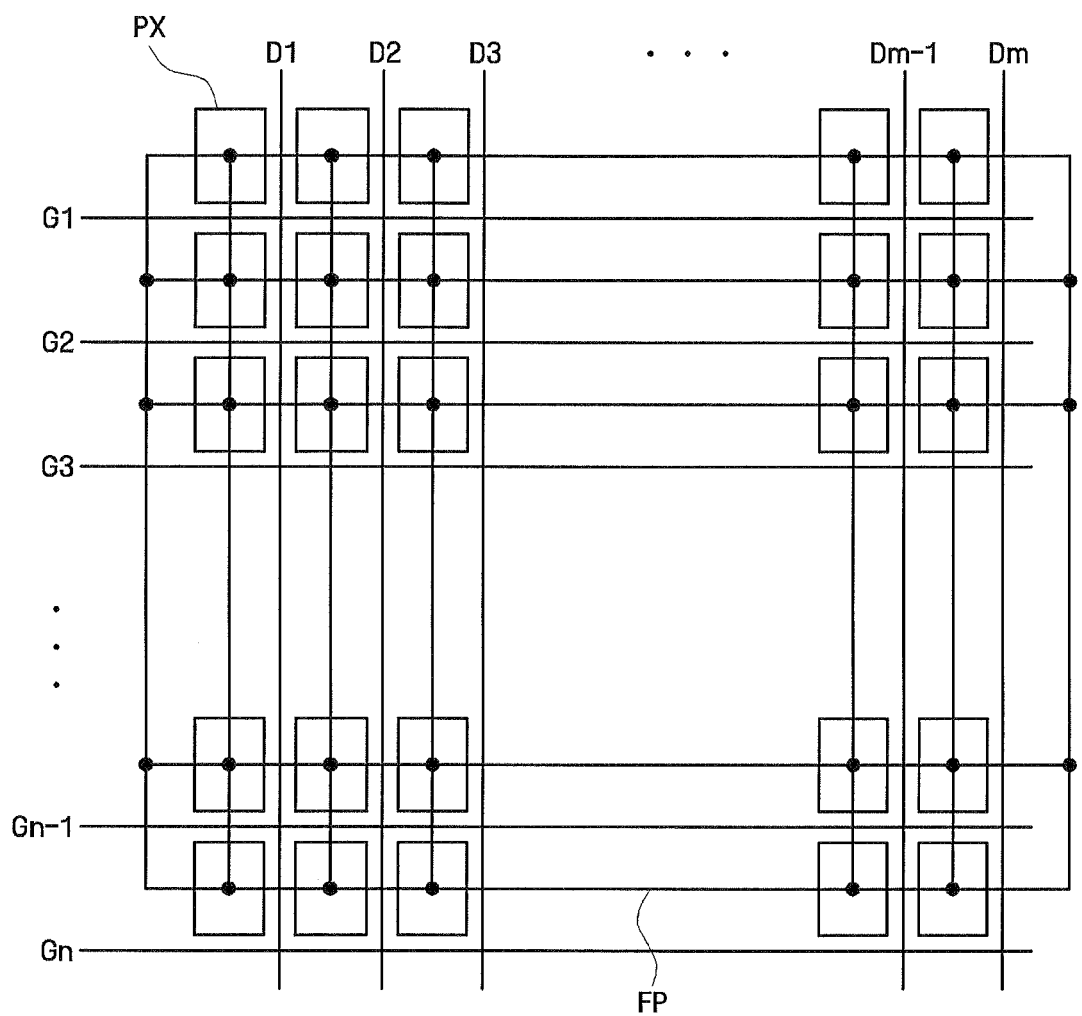
FIG. 7D is a simplified overall layout of the TFT substrate of the exemplary embodiment of FIG. 7A according to the present invention.

Referring to FIGS. 7A through 7D, another embodiment of this invention is explained. FIG. 7A is a layout of one pixel of the TFT substrate of the present embodiment while FIGS. 7B and 7C are cross-sectional views of a pixel taken along a line VIIb-VIIb' of FIG. 7A and a layout of the floating electrode and bridge electrode of FIG. 7A respectively. For more explanation, FIG. 7D shows a simplified LCD panel of this embodiment. To make the explanation brief, the same elements shown in FIGS. 1A through 4 are expressed with the same reference numerals and corresponding explanations will be omitted. Basically, every element other than the bridge electrode in FIGS. 7A through 7D is the same as the corresponding element in FIGS. 1A through 4.

In this embodiment of FIGS. 7A through 7D, a vertically extending bridge electrode 84 electrically connects different pixel's different floating electrodes 21. More specifically, bridge electrode 84 electrically connects the intra-pixel connecting pattern 21b of one pixel and light blocking pattern 21a of the other pixel.

Referring to FIG. 7A, contact holes 78 and 79 are formed on the passivation layer 70 to expose the floating pattern 21 of the upper pixel and the floating pattern 21 of the lower pixel, respectively. A bridge electrode 84 electrically connects the floating patterns of the upper pixel and the lower pixel through the contact holes 78 and 79.

In FIGS. 7B and 7C, floating electrodes 21a under passivation layer 30 of two neighboring pixels are partially exposed to bridge electrode 84 for electrical connection. In this embodiment, bridge electrode 84 may be the same material with pixel electrode 82 on the same layer.

With the simplified LCD panel of FIG. 7D, floating electrode FP covers all the pixels PX of the TFT substrate which are inter connected to each other while the floating electrode is isolated from outer circuits. More specifically, floating electrode FP is formed on every row of pixels to extend in parallel with the gate lines of the TFT substrate. Each end portions of respective floating electrodes are connected to each other. Finally, respective floating electrodes are electrically connected to each other within the image display area by bridges extended in the data line direction. Consequently, every floating electrode within the display area of the panel bears uniform floating potential all over the TFT panel because horizontally extending floating electrodes are vertically connected by vertically extending bridge electrodes. Evenly distributed floating potential can prevent uneven coupling between data lines and floating electrodes of each pixel to minimize irregular vertical crosstalk by suppressing differently coupled potential between data lines and pixel electrodes of each pixel.

Figure 8A:
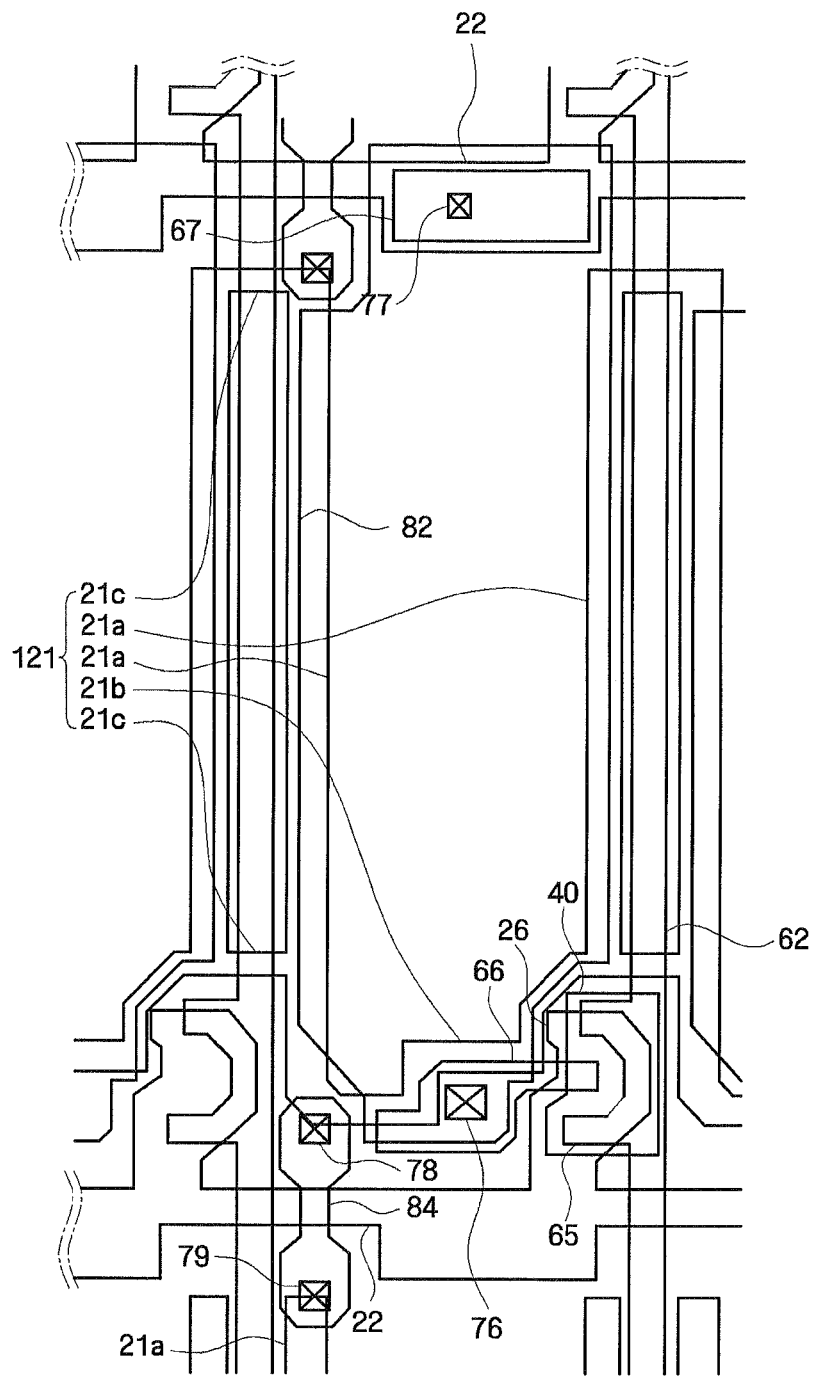
FIG. 8A is a layout of a pixel of a TFT substrate of an exemplary embodiment according to the present invention.
Figure 8B:
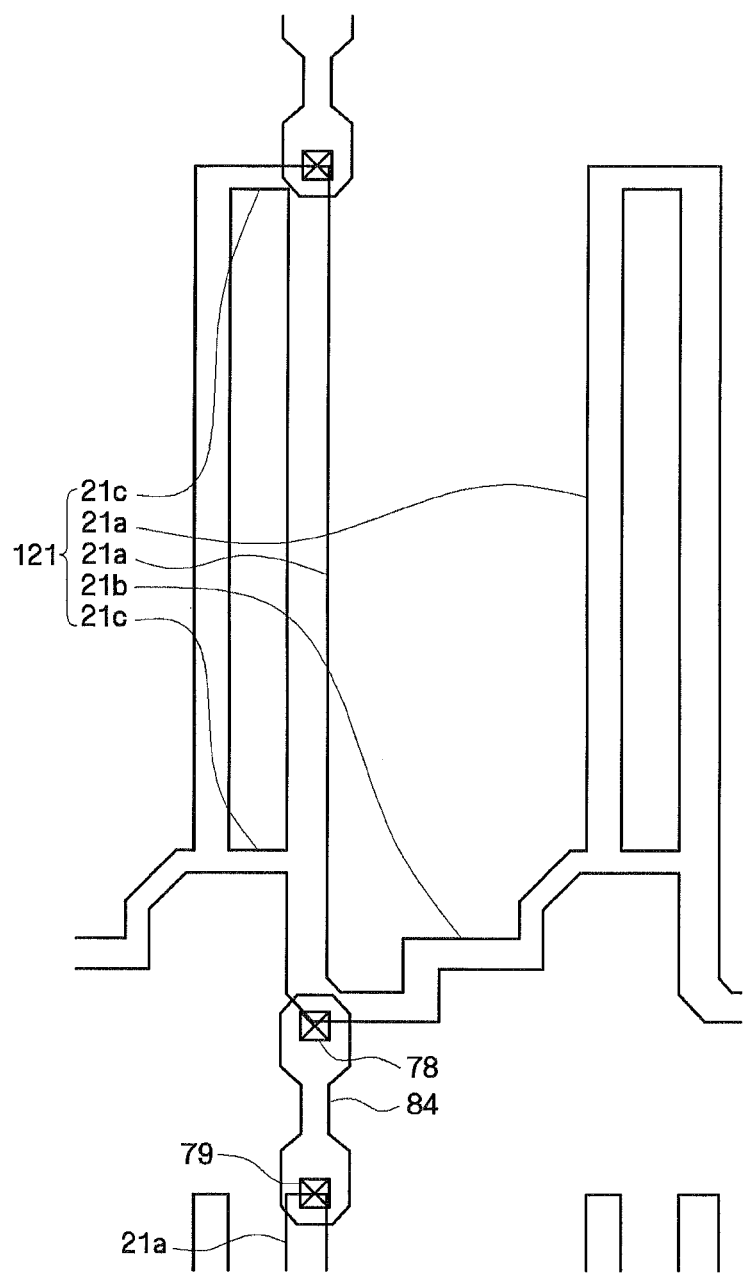
FIG. 8B is a layout of a floating pattern and a bridge electrode formed on the TFT substrate of the exemplary embodiment of FIG. 8A according to the present invention.

Referring to FIGS. 8A and 8B, another embodiment of this invention is explained. FIG. 8A is a layout of one pixel of the TFT substrate of the present embodiment; FIG. 8B is a layout of the floating electrode and bridge electrode of FIG. 8A. For a brief explanation, the same elements shown in FIG. 7A through FIG. 7D are expressed with the same reference numeral and corresponding explanations will be omitted. Basically, every element other than the shape of the floating electrode in FIGS. 8A and 8B is the same as the corresponding element in FIGS. 7A through 7D.

The floating pattern of FIGS. 8A and 8B has a pair of light blocking patterns 21a with one data line inbetween and an inter-pixel connection pattern 21c which connects the pair of light blocking patterns 21a. Here, the number of inter-pixel connecting pattern may be more than one although FIGS. 8A and 8B shows one inter-pixel connection pattern.

With the enlarged overlap area between floating electrode 21 and data line 62, the coupling capacitance difference between each light blocking pattern 21a of floating electrode and data line 62 can be reduced when each light blocking pattern 21a does not have the same overlay with data line 62. Consequently, irregular vertical crosstalk is less recognized.

If the semiconductor layer is extended to beneath the data line 62, photo leakage may be incurred by the light entering the semiconductor layer from backlight and cause poor image quality. However, the enlarged overlap area of this embodiment can screen light entering the semiconductor layer and enhance the image quality.

Figure 9A:
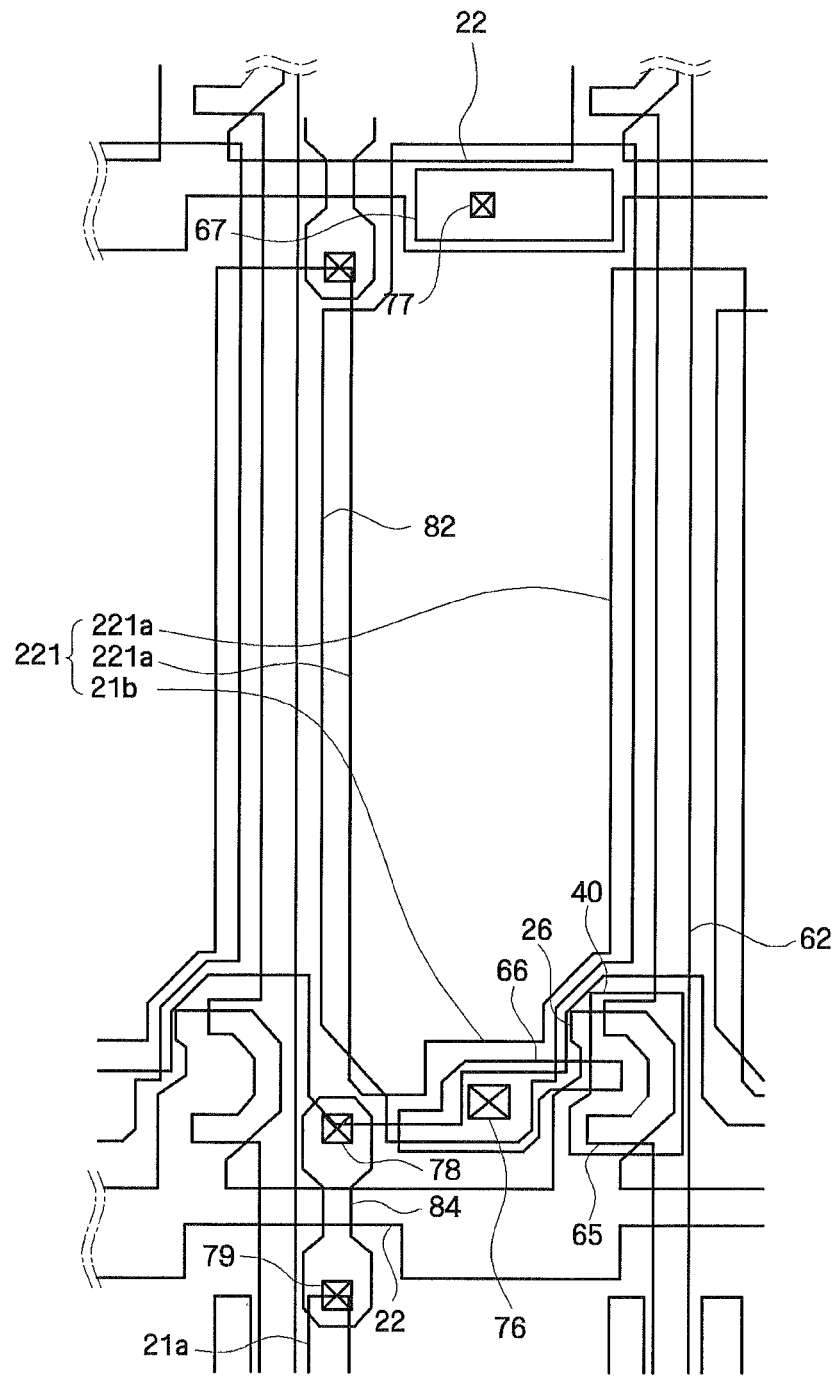
FIG. 9A is a layout of a pixel of a TFT substrate of an exemplary embodiment according to the present invention.

Referring FIGS. 9A and 9B, another embodiment of this invention is explained. FIG. 9A is a layout of one pixel of a TFT substrate of present embodiment; FIG. 9B is a layout of the floating electrode and bridge electrode of FIG. 9A. For brief explanation, the same elements shown in FIG. 8A through FIG. 8B are expressed with the same reference numeral and corresponding explanations will be omitted. Basically, every element other than the shape of floating electrode in FIGS. 9A and 9B is the same as the corresponding element in FIGS. 8A and 8B.

The floating electrode 21 of FIGS. 9A and 9B comprises a light blocking pattern 21a overlapping with data line 62 and an intra-pixel connecting pattern 21b. The light blocking pattern 21a may be wide enough to fully cover the data line 62 with a bigger width than the data line's width at least in one horizontal direction. The light blocking pattern 21a may be also partially overlapped with pixel electrodes 82 disposed along with data line 62.

Thus, the enlarged light blocking pattern is effective for controlling irregular vertical crosstalk. Moreover, the enlarged light blocking pattern 21a is even more effective when the TFT substrate has a semiconductor layer under data line 62 because semiconductor layer is apt to cause a photo leakage current which adversely affects image quality.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:
1. A liquid crystal display panel comprising:
an insulating substrate;
a plurality of gate lines extending in a first direction on the insulating substrate;
a plurality of data lines extending in a second direction that crosses with the gate lines to define a plurality of pixels;
each pixel comprising a pixel electrode connected to a thin film transistor and disposed within said pixel;
a plurality of light blocking electrodes, each light blocking electrode corresponding to a pixel, and comprising a plurality of first portions extending in the second direction, a plurality of second portions extending in the first direction and a third portion extended from the first portions, wherein the second portions and first portions are directly connected, and the third portion is formed along a boundary portion of the pixel electrode and includes a plurality of bent portions; and
a bridge electrode connecting the third portion of a third pixel and the first portion of a fourth pixel disposed next to the third pixel in the second direction,
wherein a first pixel and a second pixel are next to each other in the first direction and
wherein the third portion connects a plurality of the first portions within the first pixel,
wherein the first portion of the light blocking electrode of the first pixel and the first portion of the light blocking electrode of the second pixel extend substantially parallel along opposite sides of a data line and are interconnected across the data line via interconnected second portions of the first and second pixels,
wherein the third portion extends in a direction that is different from an extension direction of the first portions at a point where the third portion meets the first portions.

2. The liquid crystal display panel of claim 1, wherein the bridge electrode crosses a gate line from among the plurality of gate lines.

3. The liquid crystal display panel of claim 1, wherein the Bridge electrode connects the third portion of the third pixel and the first portion of the fourth pixel via contact holes.

4. The liquid crystal display panel of claim 3, wherein the third pixel has a first contact hole exposing the third portion of the light blocking electrode and wherein the fourth pixel has a second contact hole exposing the first portion of the light blocking electrode.

5. The liquid crystal display panel of claim 1, wherein the bridge electrode is the same layer with the pixel electrode.

6. The liquid crystal display panel of claim 1, wherein the bridge electrode is the same layer with the pixel electrode.

7. The liquid crystal display panel of claim 1, wherein the material is a transparent conductive oxide.

8. The liquid crystal display panel of claim 7, wherein the transparent conductive oxide is selected from IZO and ITO.

9. The liquid crystal display panel of claim 1, wherein the bridge electrode is of dumbbell shape.

10. The liquid crystal display panel of claim 9, wherein the bridge electrode has two contact portions that contact with contact holes and a connecting portion that connects the contact portions, and wherein the contact portions have a larger width than the connecting portion.

11. The liquid crystal display panel of claim 1, wherein the light blocking electrodes are disposed and interconnected in a series of pixels in the first direction to form a first light blocking electrode line and a second light blocking electrode line, wherein the first light blocking electrode line and the second light blocking electrode line are in different series of pixels, wherein the first light blocking electrode line has a first end point and a second end point, and wherein the second light blocking electrode line has a third end point and a fourth end point,
wherein the first end point and the third end point are at a first side of the substrate and interconnected and/or wherein the second end point and the fourth end point are at a second side of the substrate and interconnected.

* * * * *